US008244464B2

(12) United States Patent
Kutomi

(10) Patent No.: US 8,244,464 B2
(45) Date of Patent: Aug. 14, 2012

(54) NAVIGATION APPARATUS AND METHOD AND COMPUTER PROGRAM PRODUCT FOR THE SAME

(75) Inventor: Shinji Kutomi, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 394 days.

(21) Appl. No.: 12/696,179

(22) Filed: Jan. 29, 2010

(65) Prior Publication Data

US 2010/0235092 A1     Sep. 16, 2010

(30) Foreign Application Priority Data

Mar. 12, 2009  (JP) .................................. 2009-59300
Nov. 4, 2009   (JP) ................................. 2009-253021

(51) Int. Cl.
*G01C 21/00* (2006.01)

(52) U.S. Cl. ........ 701/412; 701/417; 701/442; 701/450; 340/995.21

(58) Field of Classification Search .................. 701/400, 701/408–413, 417, 430, 442, 450; 340/988, 340/995.21, 995.22, 995.25, 996
See application file for complete search history.

(56) References Cited

U.S. PATENT DOCUMENTS

| | | | | | |
|---|---|---|---|---|---|
| 4,982,332 | A | * | 1/1991 | Saito et al. .................... | 701/450 |
| 5,757,289 | A | * | 5/1998 | Nimura et al. ............ | 340/995.21 |
| 6,098,015 | A | * | 8/2000 | Nimura et al. ................ | 701/428 |
| 2005/0038595 | A1 | * | 2/2005 | Yokota et al. ................. | 701/200 |
| 2006/0217879 | A1 | * | 9/2006 | Ikeuchi et al. ................ | 701/208 |
| 2007/0150180 | A1 | * | 6/2007 | Matsuo et al. ................. | 701/208 |
| 2007/0213927 | A1 | * | 9/2007 | Ishigami et al. .............. | 701/207 |
| 2007/0282524 | A1 | * | 12/2007 | Tanizaki et al. ............... | 701/208 |
| 2008/0086262 | A1 | * | 4/2008 | Asahara et al. ................ | 701/208 |
| 2008/0162041 | A1 | * | 7/2008 | Nakamura ..................... | 701/209 |
| 2009/0150457 | A1 | * | 6/2009 | Nakamura et al. ............ | 707/203 |
| 2010/0042315 | A1 | * | 2/2010 | Ikeuchi et al. ................ | 701/200 |
| 2010/0057352 | A1 | * | 3/2010 | Nakae et al. .................. | 701/208 |
| 2010/0223000 | A1 | * | 9/2010 | Nakae et al. .................. | 701/201 |

FOREIGN PATENT DOCUMENTS

| | | |
|---|---|---|
| JP | A-8-271272 | 10/1996 |
| JP | B2-2778374 | 5/1998 |
| JP | A-2003-75173 | 3/2003 |
| JP | A-2005-172578 | 6/2005 |
| JP | A-2007-52341 | 3/2007 |

OTHER PUBLICATIONS

Office Action mailed Jan. 25, 2011 in corresponding JP patent application No. 2009-253021 (and English translation enclosed).

* cited by examiner

*Primary Examiner* — Thomas Black
*Assistant Examiner* — Ce Li
(74) *Attorney, Agent, or Firm* — Posz Law Group, PLC

(57) ABSTRACT

A navigation apparatus is disclosed. The navigation apparatus is configured to: acquire a trace of a vehicle; produces unregistered road data representative of an unregistered road based on the trace when the vehicle travels on the unregistered road; register the unregistered road data in a storage medium; determine whether the vehicle makes a turn in direction; determine based on the trace whether deviation of the vehicle from a road is greater than or equal to a deviation threshold, when it is determined the vehicle makes the turn in direction; and prohibits the unregistered road data from being registered in the storage medium when it is determined that the deviation of the vehicle from the road is less than the deviation threshold.

9 Claims, 4 Drawing Sheets

NAVIGATION APPARATUS AND METHOD AND COMPUTER PROGRAM PRODUCT FOR THE SAME

CROSS REFERENCE TO RELATED APPLICATION

The present application is based on Japanese Patent Applications No. 2009-59300 filed on Mar. 12, 2009 and No. 2009-253021 filed on Nov. 4, 2009 disclosures of which are incorporated herein by reference.

BACKGROUND OF THE INVENTION

1. Field of the Invention

The present invention relates to a navigation apparatus that acquires a trace of a vehicle and learns an unregistered road (which is a road not stored in a map data storage medium). The present invention also relates to a method and a computer program product for a navigation apparatus.

2. Description of Related Art

A navigation apparatus having a road learning function is known (e.g., see JP-H6-88733A). According to such a navigation apparatus, when a vehicle travels on an unregistered road (which is a road not stored in a map storage medium), the navigation apparatus acquires a trace of a vehicle traveling on unregistered road and records the trace in unregistered road storage means through converting a data format of the trace, so that the converted trace and the road map data stored in the map storage medium have the same data format. When the vehicle travels again an area having the unregistered road, the navigation apparatus displays the unregistered road on a road map together with a present position mark indicative of an estimated position of the vehicle.

The inventor of the present application has found that the navigation apparatus described in the JP-H6-88733 involves the following difficulties. When it is determined that a vehicle travels on an unregistered road, there is a possibility that a vehicle makes a turn in direction by traveling on an empty lot adjacent to a road, and a trace of the vehicle on the empty lot is recorded as unregistered road in the unregistered road storage means. As seen from the above, since such an unneeded path can be recorded and accumulated in the unregistered road storage means, accuracy of learning an unregistered road may be disadvantageously low.

SUMMARY OF THE INVENTION

In view of the above and other difficulties, it is an objective of the present invention to provide a navigation apparatus that is capable of learning an unregistered road with high accuracy even when a vehicle makes turn in direction. It is also an objective of the present invention to provide a method and a computer program product for a navigation apparatus.

According to a first aspect of the present invention, a navigation apparatus is provided. The navigation apparatus is configured to (1) acquire a trace of a vehicle, (ii) determine based on the trace whether the vehicle travels on an unregistered road, which is a road not stored in a map data storage medium, (iii) produce, based on the trace, unregistered road data representative of the unregistered road when it is determined that the vehicle travels on the unregistered road, and (iv) perform registration of the unregistered road data in the map data storage medium. The navigation apparatus includes: a turn determination section configured to determine whether the vehicle makes a turn in direction; a deviation determination section configured to determine based on the trace whether deviation of the vehicle from a registered road during the turn in direction is greater than or equal to a first threshold, when the turn determination section determines that the vehicle makes the turn in direction, the registered road being a road that is stored in the map data storage medium; and a record prohibition section configured to prohibit the registration of the unregistered road data in the map data storage medium when the deviation determination section determines that the deviation of the vehicle from the registered road is less than the first threshold.

According to a second aspect of the present invention, there is provided a method for learning an unregistered road data by using a navigation apparatus for a vehicle. The method includes the steps of: acquiring registered road data representative of a registered road from a map data storage medium, the registered road being a road that is registered in the map data storage medium; acquiring a trace of the vehicle by using a position detector of the navigation apparatus; determining, based on the trace and the registered road data, whether the vehicle travels on an unregistered road, the unregistered road being a road that is not registered in the map data storage medium; transforming the trace into the unregistered road data representative of the unregistered road when it is determined that the vehicle travels on the unregistered road; recording the unregistered road data in the map data storage medium; determining whether the vehicle makes a turn in direction; determining based on the trace whether deviation of the vehicle from the registered road during the turn in direction is greater than or equal to a threshold, when it is determined that the vehicle makes the turn in direction; and prohibiting the unregistered road data from being recorded in the map data storage medium when the deviation of the vehicle from the registered road during the turn in direction is determined to be less than the threshold.

According to a third aspect of the present invention, there is provided a computer program product for enabling a navigation apparatus mounted to a vehicle to learn unregistered road data, the computer program product being stored in a computer readable storage medium and configured to cause the navigation apparatus to perform the steps recited in the above-described second aspect.

According to the above-described aspects, since the registration of the unregistered road data in the map data storage medium is prohibited when it is determined that the deviation of the vehicle from the registered road during the turn in direction is less than the deviation threshold, it is possible to learn an unregistered road with high accuracy even when a vehicle makes turn in direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments will be described below with reference to the accompanying drawings.

Figure 1:
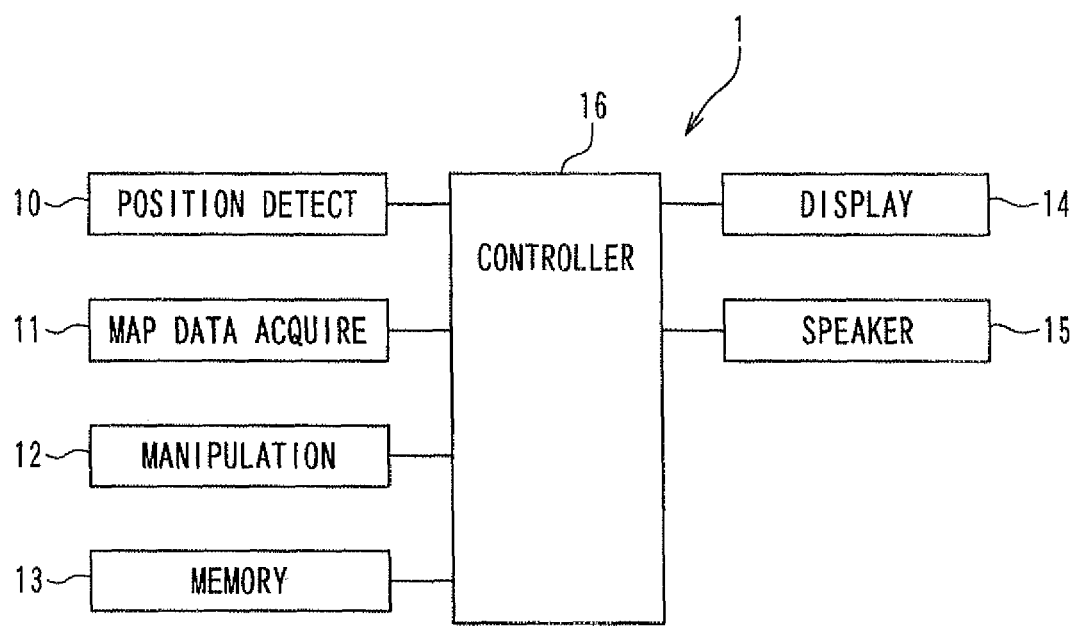
FIG. 1 is a block diagram illustrating a navigation apparatus according to one embodiment.

A configuration of a navigation apparatus 1 according to one embodiment is illustrated in FIG. 1. The navigation apparatus 1 includes a position detector 10, a map data acquisition device 11, a manipulation device 12, a memory 13, a display device 14, a speaker 15 and a controller 16. The memory 13 may be external with respect to the controller 16. In one embodiment, the navigation apparatus 1 is mounted to a vehicle.

The position detector 10 includes a geomagnetic sensor, a gyroscope, a distance sensor and a GPS receiver (any of which are not shown). Information for locating a present position of the vehicle is outputted to the controller 16 from each of the foregoing components of the position detector 10. The information for locating a present position of the vehicle indicates present positional coordinates (e.g., longitude and latitude) and a height of the present position (e.g., altitude).

The map data acquisition device 11 is for acquisition of map data stored in a map data storage medium. In one embodiment, a hard disk drive is employed as the map data storage medium. The map data includes road data, which contains an identifier of each link (link ID), coordinates of a starting point and an end point of a road or a link, a road distance, a road type, a road width, a road shape, a road name, the number of lanes, and the like. The map data further includes: map matching data for position detection improvement; a background data for locations, shapes, names and the like of rivers, lakes, oceans, railways and the like; and facility data for locations, types, phone numbers and the like of facilities in various areas.

The manipulation device 12 includes a touch-sensitive switch provided on a screen of the display device 14, a mechanical switch arranged in a periphery of the screen of the display device 14, and the like. A signal that depends on user manipulation on the switch is outputted to the controller 16 from the manipulation device 12.

The memory 13 may be provided separately from an inside of the controller 16 and include a non-volatile memory. A Variety of data is recorded in the memory 13 in accordance with an instruction from the controller 16.

The display device 14 includes a screen such as a liquid crystal screen for instance. The display device 14 can display an image on the screen in accordance with an image signal from the controller 16. The speaker 15 outputs sound and speech in accordance with a sound signal and speech signal from the controller 16.

The controller 16 is configured as a computer including a CPU, an internal memory and an I/O. The CPU executes various processes in accordance with a program stored in the internal memory or another storage medium.

Processes performed by the controller 16 include a present position calculation process, a trace recording process, a map display process, a route retrieval process, and a travel guidance process. In the present position calculation process, the controller 16 calculates the present position of the vehicle based on signals inputted from the position detector 10. In the trace recording process, the controller 16 acquires and collects a trace of the vehicle (i.e., vehicle track) through tracking the present position of the vehicle at predetermined intervals (e.g., predetermined distance intervals, predetermined time intervals), and records the trace of the vehicle in the memory 13. In the map display process, the controller 16 acquires date for a map around the present position of the vehicle via the map data acquisition device 11, and displays an image in which a vehicle position mark is superimposed on the map. In the route retrieval process, the controller 16 retrieves an optimum route from the present position to a destination by using the Dijkstra's method or the like to provide a navigation route for use in navigation. In the travel guidance process, the controller 16 performs travel guidance for guiding the vehicle along the navigation route.

The navigation apparatus 1 has a function of registering unregistered-road-data. More specifically, when it is determined based on the trace that the vehicle travels on an unregistered road, the navigation apparatus 1 produces unregistered road data indicative of the unregistered road based on the trace, and registers the unregistered road data in the map data storage medium. In the present disclosure, the unregistered road is a road that is not stored or not registered in the map data storage medium. A registered road is a road that is stored or registered in the map data storage medium.

Figure 2:
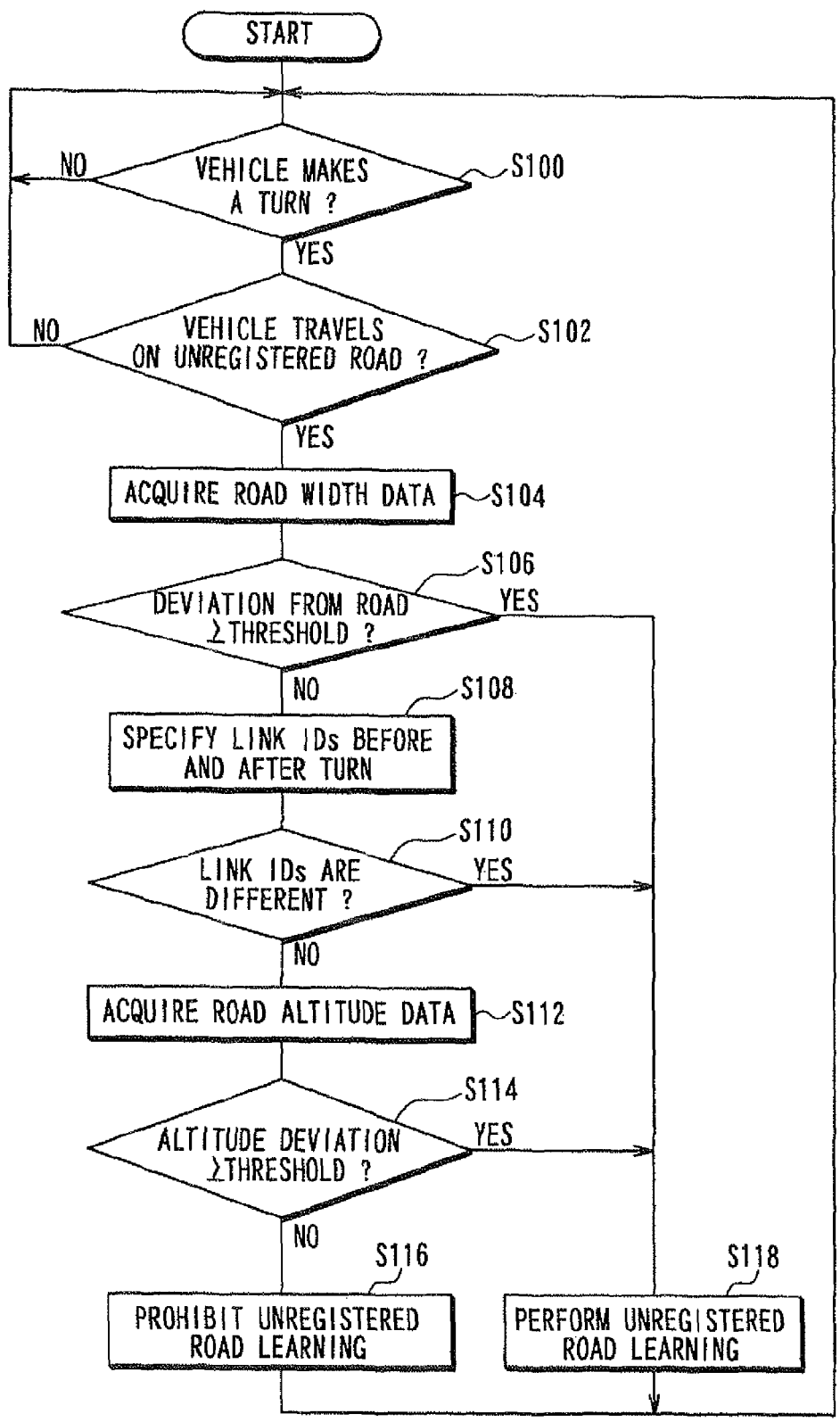
FIG. 2 a flowchart illustrating processes for registration of an unregistered road, the processes being related to a vehicle turn in direction.

FIG. 2 is a flowchart illustrating processes for registration of an unregistered road, the processes being related to a vehicle turn in direction. Referring to FIG. 2, the processes for registration of unregistered road data will be described. The navigation apparatus 1 starts operations in response to the switching on of an ignition switch of the vehicle, and the controller 16 starts performing the processes illustrated in FIG. 2. The processes illustrated in FIG. 2 are ended when the ignition switch of the vehicle is switched off.

At S100, the controller 16 determines whether the vehicle makes a turn in direction (e.g., makes a U-turn). For example, the controller 16 analyzes the trace, and determines whether the vehicle makes a turn in direction (e.g., makes a U-turn) based on whether a distance between a turn start point and a turn end point is less than or equal to a predetermined reference distance or zone (e.g., 100 m). The turn start point is a point where the vehicle starts changing a heading direction thereof in traveling parallel to a registered road. The turn end point is a point where the heading direction of the vehicle is reversed and the vehicle starts traveling parallel to a registered road. Further, it should be noted in the above that each of the turn start point and the turn end point is a point on a registered road. When the distance between the turn start point and the turn end point is more than the predetermined reference distance (e.g., 100 meters), a conceivable situation in this case is that the vehicle travels in a facility or the like, and thus, it is determined that the vehicle does not a turn in direction. Further, if the vehicle makes a turn in direction in a parking lot or the like, the turn start point and the turn end point are outside a registered road, and thus, it is determined that the vehicle does not make a turn in direction. Alternatively, the determination of whether the vehicle makes a turn in direction (e.g., U-turn) may be made based on a shape of the trace. For example, a trace model for the turn in direction may be learnt in advance. When a high degree of similarity is detected between the shape of the actual trace and the shape of the trace model for the turn in direction, it may be determined that the vehicle makes a turn in direction. Alternatively, it may be determined whether the vehicle makes a turn in direction, not based on whether the distance between the turn start point and the turn end point is less than or equal to the predetermined reference distance, but based on a predetermined period of time. For example, it may be determined whether the vehicle makes a turn in direction, based on whether a travel time between the turn start point and the turn end point is a predetermined period of time (e.g., 30 seconds) or less. Alternatively, it may be determined whether the vehicle makes a turn in direction, based on information about angular velocity detected by the gyroscope of the position detector 10 or the like.

When it is determined that the vehicle does not make a turn in direction, corresponding to "NO" at S100, the process S100 is performed again. When it is determined that the vehicle makes a turn in direction, corresponding to "YES" at S100, the process proceeds to S102. At S102, the controller 16 determines based on the trace whether the vehicle travels on an unregistered road during the turn in direction. The unregistered road is a road that is not stored in the map data storage medium. When it is determined that the vehicle does not travel on an unregistered road, corresponding to "NO" at S102, the process returns to S100. When it is determined that the vehicle travels on an unregistered road, corresponding to "YES" at S102, the process proceeds to S104. At S104, the controller 16 acquires data of a road width of a place which the vehicle passes through during the turn in direction. More specifically, referring to the map data, the controller 16 acquires data width data for a link which the vehicle passes through during the turn in direction.

Figure 3A:
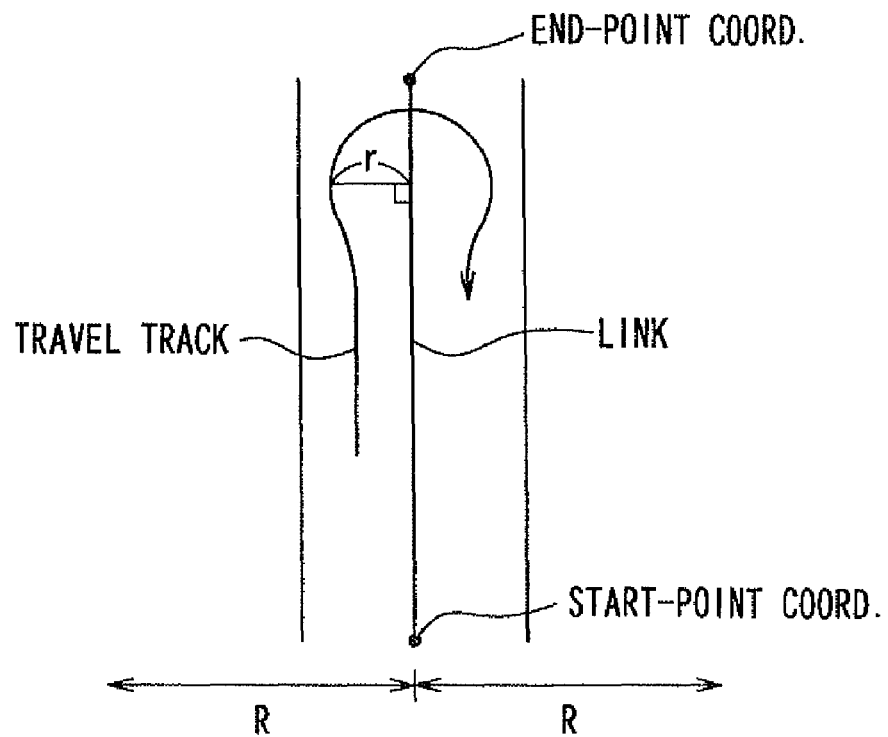
FIGS. 3A and 3B are diagrams for explanation on deviation determination.

At S106, based on the trace of the vehicle, the controller 16 determines whether horizontal deviation of the vehicle from the registered road during the turn in direction is greater than or equal to a threshold. For example, it is determined whether the horizontal deviation of the vehicle from the registered road is greater than or equal to the threshold, based on the followings. As shown in FIG. 3A, a length "r" of a line, which is between an arbitrary point of the trace (i.e., vehicle track) and a link (corresponding to a road center) and is perpendicular to the link, is compared to a threshold "R", and it is determined whether the length "r" of the perpendicular line is greater than or equal to the threshold "R". The threshold "R" is set taking into consideration a space required for a vehicle to make a turn in direction (e.g., U-turn). The threshold "R" is further based on the data of width of the registered road that the vehicle travels on, so that the threshold R is set to a larger value as the road width is larger. For example, when the vehicle travels on a registered road having a width of 10 meters, the threshold "R" may be set to 30 meters based on adding a road width of 10 meters to a sufficient distance of 20 meters to make a turn in direction (e.g., U-turn).

Figure 4A:
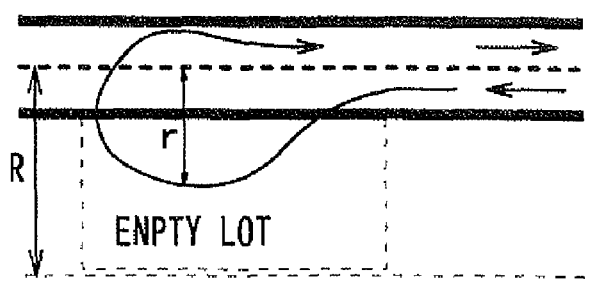
FIGS. 4A to 4D are diagrams each illustrating a trace (vehicle track) of a vehicle making a turn in direction.

As shown in FIG. 4A, when the vehicle makes a turn in direction through traveling on an empty lot adjacent to a registered road and horizontally deviates from the registered road by the threshold or less, the determination "NO" is made at S106, and the process proceeds to S108.

Figure 4B:
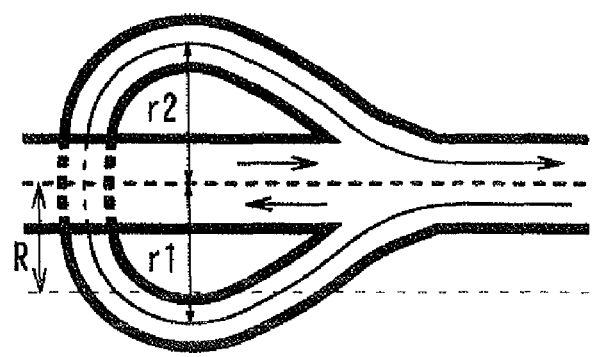

When a ramp for a turn in direction is made as a new road as shown in FIG. 4B, and when the vehicle makes a turn in direction by traveling the ramp, it is determined that the vehicle makes a turn in direction while horizontally deviating from a registered road by the threshold or more, and the determination "YES" is made at S106, and the process proceeds to S118. At S118, the learning of an unregistered road is performed. More specifically, based on the trace, unregistered road data indicative of the unregistered road is produced and registered in the map data storage medium, and the process returns to S100.

At S108, referring to the map data, the controller 16 specifies link IDs before and after the turn in direction of the vehicle. More specifically, referring to the map data, the controller 16 specifies a link ID of the link where the vehicle turn in direction is started and a link ID of the link where the vehicle turn in direction is ended. At S110, the controller 16 determines whether the link IDs before and after the turn in direction of the vehicle are different from each other. When it is determined that the link IDs before and after the turn in direction are the same, corresponding to "NO" at S110, the process proceeds to S112. When it is determined that the link IDs before and after the turn in direction are different from each other, corresponding to "YES" at S110, the process proceeds to S118.

Figure 4C:
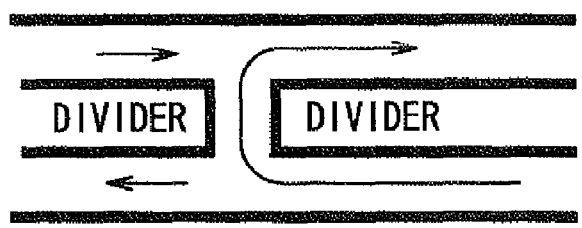

A highway or the like has so called a divided road (i.e., a dual carriageway), in which two directions of traffic are separated by a central median (i.e., divider) and different link IDs are assigned to the two directions of traffic. Such a divided road may have a U-turn path at the central median to enable a vehicle to turn in direction. When a divided road as illustrated in FIG. 4C is made as a new road and when the vehicle makes a turn in direction by traveling the U-turn path through the central median, the determination "NO" is made at S106 because the vehicle does not horizontally deviate from the road by the threshold or more. Further, because the link IDs before and after the turn in direction are different from each other, the determination at S110 results in "YES" and the process proceeds to S118 where the learning of the unregistered road is performed. More specifically, based on the trace, the unregistered road data indicative of the unregistered road is produced and registered in the map data storage medium, and the process returns to S100.

At S112, the controller 16 acquires data of altitude of a place where vehicle starts making the turn in direction or data of altitude of a place where the vehicle finish making the turn in direction. More specifically, referring to the map data, the controller 16 acquires data of altitude of a place where the vehicle starts making the turn in direction and data of altitude of a place where the vehicle finishes making the turn in direction.

Figure 3B:
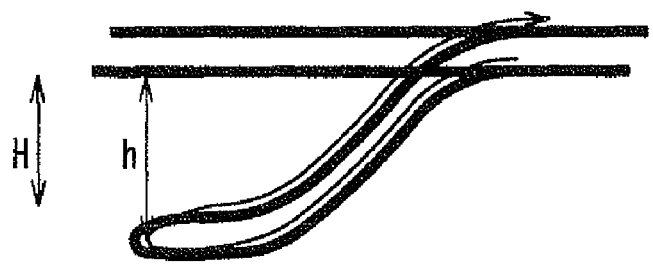

At S114, it is determined based on the trace of the vehicle whether altitude deviation from a registered road during the turn in direction is greater than or equal to a threshold. For example, as shown in FIG. 3B, an absolute value of a maximum altitude difference "h" along the vehicle track produced in the turn in direction is compared to a preset threshold "H". The absolute value of the altitude difference "h" may be measured with respect to a place where the vehicle starts making the turn in direction or a place where the vehicle finishes making the turn in direction. When the absolute value of the altitude difference "h" is greater than or equal to the threshold "H", it is determined that the altitude deviation from the registered road during the turn in direction is greater than or equal to a threshold. For example, the threshold H is set to a value (e.g., 10 meters) representative of a minimum altitude difference required in newly constructing a road above or below an existing road.

Figure 4D:
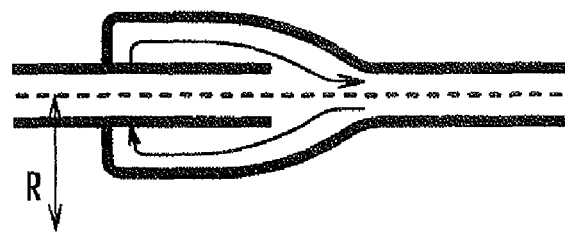

For example, as shown in FIG. 4D, when a ramp for a vehicle to turn in direction is made as a new road so as not to horizontally deviate from a existing road by more than the threshold, and when the a vehicle travels through the ramp, the altitude deviation along the trace from the point on the map data stored in the map data storage medium becomes greater than or equal to a threshold, as shown in FIG. 3B. In this case, since the horizontal deviation from the registered road during the turn in direction is less than the threshold, the determination at S106 results in "NO". Further, since the link IDs before and after the turn in direction are the same, the determination at S110 results in "NO". Further, since the altitude deviation from the registered road is greater than or equal to the threshold, the determination at S114 results in "YES", and the process proceeds to S118 where the learning of an unregistered road is performed. More specifically, based on the trace, unregistered road data indicative of the unregistered road is produced and registered in the map data storage medium, and the process returns to S100.

When it is determined at S114 that the altitude deviation from the registered road is less than the threshold, corresponding to "NO" at S114, the process proceeds to S116 where the learning of an unregistered road is prohibited, and the process returns to S100.

According to the above configuration, when it is determined that the vehicle makes a turn in direction, the controller 16 determines based on the vehicle track whether the horizontal deviation of the vehicle from a registered road is greater than or equal to a first threshold. When it is determined that the horizontal deviation of the vehicle from a road is less than the first threshold, the controller 16 prohibits registration of unregistered road date (produced based on the vehicle track) in the map storage medium. For example, as shown in FIG. 4A, when a vehicle travels an empty lot adjacent to a registered road to make a turn in direction while deviating to a side of the road, the learning of an unregistered road based on the trace is prohibited. The registration of an unregister road in the map data storage medium based on such an unneeded trace is not performed.

For example, as shown in FIG. 4B, when a ramp for turn in direction is constructed as a new road and when a vehicle travels on the ramp to make a turn in direction, the unregistered road data produced based on the trace becomes needed data, and thus, the learning of the unregistered road is performed.

According to the above configuration, it is determined whether road identifiers of roads before and after the vehicle turn in direction math each other. When it is determined that the road identifier before the turn in direction does not match the road identifier after the turn in direction, the unregistered road data produced based on the trace of the vehicle is registered in the map data storage medium. For example, as shown in FIG. 4C, a vehicle may travel on a divided road, which has a central median (i.e., a divider) separating the directions of traffic from each other and different link IDs are assigned to the directions of traffic. When the vehicle turns in direction by traveling a U-turn path extending across the centeral median of the divided road, the unregistered road data produced based on the trace becomes needed road, and the learning of the unregistered road is performed.

Further, according to the above configuration, the controller 16 detects and acquires an altitude difference, which is a difference in altitude between (i) an unregistered road on which a vehicle travels in making a turn in direction and (ii) a registered road on which the vehicle travels before or after making the turn in direction. When the detected altitude difference exceeds a second threshold, the unregistered road data produced based on the trace of the vehicle is registered in the map data storage medium. For example, as shown in FIG. 4D, when a ramp for turn in direction is made so as to be within the first threshold (or with road width "R") of a registered road connected with the ramp, and when a vehicle travels through the ramp, the unregistered road data produced based on the trace is needed data, and the learning of an unregistered road is performed. As seen above, according to the present embodiment, the navigation apparatus 1 can learn an unregistered road with high accuracy.

The above embodiment can be modified in various ways, examples of which will be described below.

In the above embodiment, at S108, a link ID is used as an example of a road identifier and it is determined whether a link ID before a turn in direction matches a link ID after the turn in direction. Alternatively, information other than a link ID may be used as a road identifier, and it may be determined at S108 whether a road identifier before a turn in direction matches a road identifier after the turn in direction.

In the above embodiment, at 5106, a length "r" of a line, which is between a point of the trace and a link (corresponding to a road center) and is perpendicular to the link, is compared to a threshold "R", and it is determined whether the length "r" of the perpendicular line is greater than or equal to the threshold "R". It is thereby determined whether the horizontal deviation of the vehicle from the registered road is greater than or equal to the threshold. Alternatively, based on another way, it may be determined whether horizontal deviation of a vehicle from a road is greater than or equal to a threshold. For example, through comparing (i) a corrected value "r" (whose dimension may be length) of the present position produced by map matching to (ii) a threshold "R", it may be determined whether horizontal deviation of a vehicle from a registered road is greater than or equal to a threshold.

In the above embodiment, when the determination "NO2 is made at all processes S106, S110 and S114, the learning of an unregistered road is prohibited at S116. Alternatively, one or more of S106, S110 and S114 may be used to determine whether the learning of an unregistered road is to be prohibited at S116. For example, the navigation apparatus may be configured such that when the determination at 5114 results in "NO", the learning of an unregistered road is prohibited at S116.

In the above embodiment, a hard disk drive is employed as a map data storage device. Alternatively, another device may be employed as a map data storage device. For example, a map data storage device may be a disk read device for reading map data stored in a disk medium such as a CD, a DVD and the like. In this case, since unregistered road data cannot be recorded in the disk medium, the unregistered road data may be recorded in another storage medium, which is the memory 13 for instance.

In an aspect of the above embodiment and its modification, the controller 16 performing S110 is an example of a turn determination section or means. The controller 16 performing S104 and S106 is an example of a deviation determination section or means. The controller 16 performing 5108 and S110 is an example of a road identifier determination section or means. The controller 16 performing S112 and S114 is an example of a road altitude difference detection section or means. The controller 16 performing S116 is an example of a record prohibition section or means.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a computer program product stored in a computer-readable storage medium.

What is claimed is:
1. A navigation apparatus that collects a trace of a vehicle and has a function to produce an unregistered road data representative of an unregistered road on a basis of the trace and perform registration of the unregistered road data in a map data storage medium when it is determined that the vehicle travels on the unregistered road, wherein the unregistered road is a road that is not stored in the map data storage medium, the navigation apparatus comprising:
   a turn determination section that determines whether the vehicle makes a turn in direction;
   a road deviation determination section that, in response to determining by the turn determination section that the vehicle makes the turn in direction, acquires a road width data indicative of a road width of a place where the vehicle makes the turn in direction, and determines based on the road width data and the trace of the vehicle whether, in making the turn in direction, the vehicle is deviated from a registered road by a first threshold or more, wherein the registered road is a road that is stored in the map data storage medium; and an unregistered road data record prohibition section that prohibits the registration of the unregistered road data in the map data storage medium when the road deviation determination section determines that, in marking the turn in direction, the vehicle is deviated from the registered road by less than the first threshold.

2. The navigation apparatus according to claim 1, wherein:
the turn determination section determines whether the vehicle makes the turn in direction, based on whether a turn start point and a turn end point, each of which is on the trace and the registered road, are within a predetermined reference zone;
the turn start point is a point where a change in heading direction of the vehicle is started; and
the turn end point is a point where the heading direction of the vehicle is reversed.

3. The navigation apparatus according to claim 1, wherein:
the registration of the unregistered road data in the map data storage medium is performed when the road deviation determination section determines that, in making the turn in direction, the vehicle is deviated from the registered road by the first threshold or more.

4. The navigation apparatus according to claim 1, further comprising:
a road identifier determination section that determines whether a first road identifier that identifies the registered road on which the vehicle travels before making the turn in direction matches a second road identifier that identifies the registered road on which the vehicle travels after making the turn in direction,
wherein:
the registration of the unregistered road data in the map data storage medium is performed when the road identification determination section determines that the first road identifier, which identifies the registered road on which the vehicle travels before making the turn in direction, does not match the second road identifier, which identifies the registered road on which the vehicle travels after making the turn in direction.

5. The navigation apparatus according to claim 1, further comprising:
a road altitude difference detection section that detects an altitude difference between
the unregistered road on which the vehicle travels in making the turn in direction and
the registered road on which the vehicle travels before or after making the turn,
wherein:
the registration of the unregistered road data in the map data storage medium is performed when the altitude difference detected by the road altitude difference detection section exceeds a second threshold.

6. A navigation apparatus that collects a trace of a vehicle and has a function to produce an unregistered road data representative of an unregistered road on a basis of the trace and perform registration of the unregistered road data in a map data storage medium when it is determined that the vehicle travels on the unregistered road, wherein the unregistered road is a road that is not stored in the map data storage medium, the navigation apparatus comprising:

a turn determination section that determines whether the vehicle makes a turn in direction;

a road deviation determination section that, in response to determining by the turn determination section that the vehicle makes the turn in direction,
determines based on the trace of the vehicle whether, in making the turn in direction, the vehicle is deviated from a registered road by a first threshold or more, wherein the registered road is a road that is stored in the map data storage medium;

an unregistered road data record prohibition section that prohibits the registration of the unregistered road data in the map data storage medium when the road deviation determination section determines that, in making the turn in direction, the vehicle is deviated from the registered road by less than the first threshold; and a road altitude difference detection section that detects an altitude difference between
the unregistered road on which the vehicle travels in making the turn in direction and
the registered road on which the vehicle travels before or after making the turn in direction,
wherein the registration of the unregistered road data in the map data storage medium is performed when it is determined that the vehicle travels on the same registered road before and after making the turn in direction and that the altitude difference detected by the road altitude difference detection section exceeds a second threshold.

7. The navigation apparatus according to claim 6, wherein:
the turn determination section determines whether the vehicle makes the turn in direction, based on whether a turn start point and a turn end point, each of which is on the trace and the registered road, are within a predetermined reference zone;
the turn start point is a point where a change in heading direction of the vehicle is started; and
the turn end point is a point where the heading direction of the vehicle is reversed.

8. The navigation apparatus according to claim 6, wherein:
the registration of the unregistered road data in the map data storage medium is performed when the road deviation determination section determines that, in making the turn in direction, the vehicle is deviated from the registered road by the first threshold or more.

9. The navigation apparatus according to claim 6, further comprising:
a road identifier determination section that determines whether a first road identifier that identifies the registered road on which the vehicle travels before making the turn in direction matches a second road identifier that identifies the registered road on which the vehicle travels after making the turn in direction,
wherein:
the registration of the unregistered road data in the map data storage medium is performed when the road identification determination section determines that the first road identifier, which identifies the registered road on which the vehicle travels before making the turn in direction, does not match the second road identifier, which identifies the registered road on which the vehicle travels after making the turn in direction.

* * * * *